No. 707,762. Patented Aug. 26, 1902.
J. P. CORNUAULT.
STARTING GATE FOR RACES.
(Application filed Feb. 6, 1902.)
(No Model.) 2 Sheets—Sheet 1.
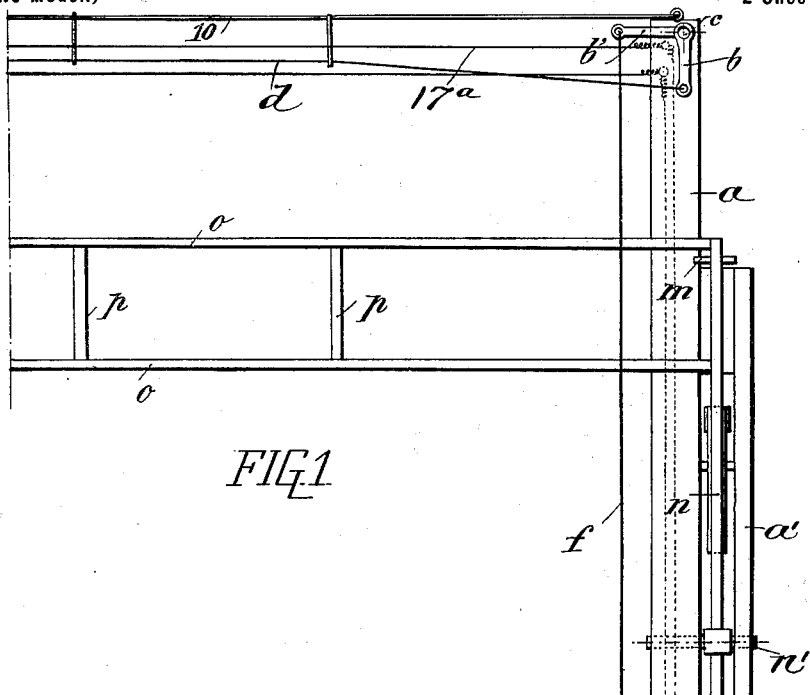
FIG. 1
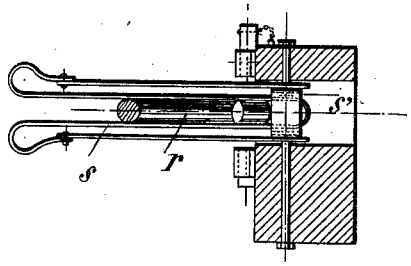
FIG. 3
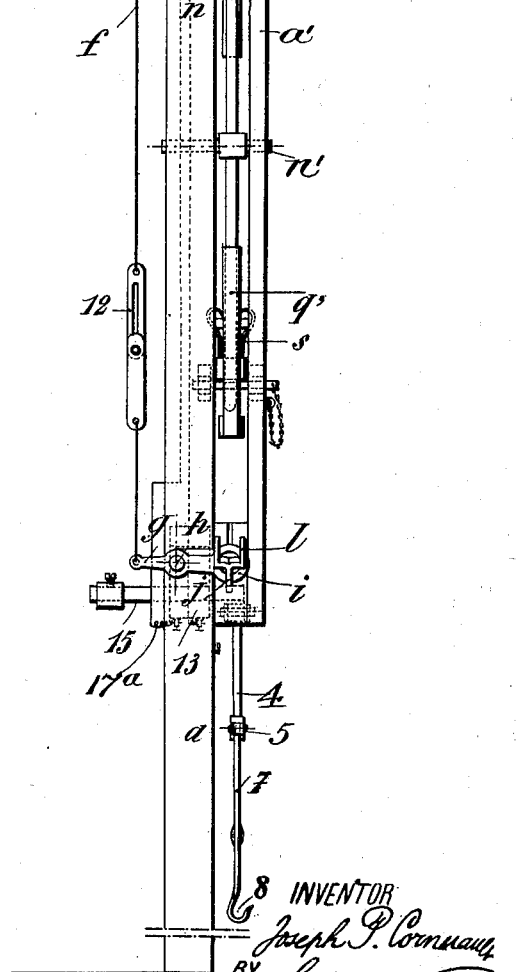
WITNESSES
Henry Suhrbier.
C. Bradway.
INVENTOR
Joseph P. Cornuault,
BY
ATTORNEYS No. 707,762. Patented Aug. 26, 1902.
J. P. CORNUAULT.
STARTING GATE FOR RACES.
(Application filed Feb. 6, 1902.)
(No Model.) 2 Sheets—Sheet 2.
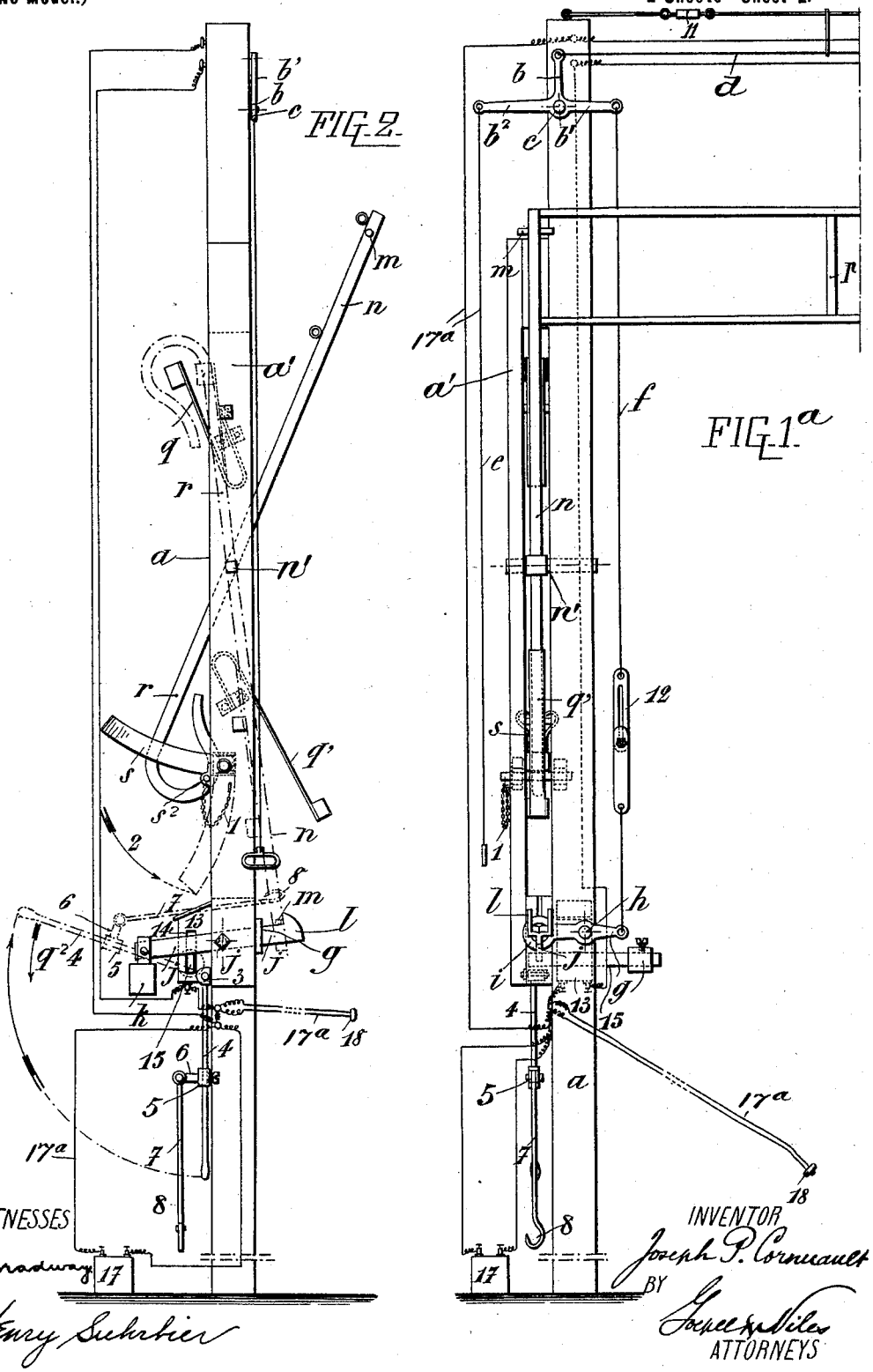
WITNESSES
C. Bradway
Henry Suhrbier
INVENTOR
Joseph P. Cornuault
BY
ATTORNEYS

UNITED STATES PATENT OFFICE.

JOSEPH PIERRE CORNUAULT, OF CHANTILLY, FRANCE.

STARTING-GATE FOR RACES.

SPECIFICATION forming part of Letters Patent No. 707,762, dated August 26, 1902.

Application filed February 6, 1902. Serial No. 92,782. (No model.)

*To all whom it may concern:*

Be it known that I, JOSEPH PIERRE CORNUAULT, a citizen of the Republic of France, residing at Chantilly, France, have invented certain new and useful Improvements in Starting-Gates for Races, (for which I have made application for Letters Patent in Great Britain under No. 15,211, dated July 25, 1901, and in France October 31, 1901, and July 29, 1901,) of which the following is a specification.

This invention relates to a starting-gate for race-courses, and has for its object to provide suitable mechanism for operating the gate manually or electrically.

The invention consists of a starting-gate for races comprising supporting-posts arranged on opposite sides of the race-course, a gate having pivotally-mounted arms and ribbons connecting said arms, actuating-springs arranged on said posts, said gate being adapted to be placed under the tension of said springs, detent means for retaining said gate in such position, means for releasing said detent means, and cushion means for arresting the motion of the gate, as will be more fully described hereinafter and finally pointed out in the claims.

In the accompanying drawings, Figure 1 is a rear view of the right end of the device. Fig. 1ª is a similar view of the left end thereof. Fig. 2 is a side view of one of the posts, and Fig. 3 is a detail view of one of the cushion devices of the gate.

Similar characters of reference indicate corresponding parts.

Referring to the drawings, $a$ represents supporting-posts, that are arranged on opposite sides of the race-course at a suitable distance in advance of the starter's station. These posts are stiffened by the tie-rods 10 at their upper ends, said tie-rods having a suitable turnbuckle 11. Upon the posts $a$ are arranged bell-crank levers, that are oppositely disposed to each other and mounted on the pivots $c$. The vertically-disposed arms $b$ of said bell-levers are connected by the rod $d$, and the horizontally-disposed arms $b'$ are connected with the tilting levers $g$ by means of the rods or chains $f$, said latter rods or chains having the adjusting-plates 12. The bell-crank lever upon the post at the left is provided with an arm $b^2$, which has depending therefrom the operating rod or chain $e$. Upon the supporting-posts $a$ are arranged devices similar in construction, each of which is composed of a tilting lever $g$, mounted upon the pivot $h$, and is provided at one end with an annular portion $i$, in which is placed one end of the weighted lever $j$, the rear end of said lever $j$ being provided with a bifurcated detent $l$ adjacent the tilting lever $g$ and with a weight $k$ at the opposite end.

Secured upon the supporting-posts $a$ are the strips $a'$, suitably spaced from the supporting-posts, and between them the arms $n$ of the gate are pivotally mounted. These arms are mounted upon the pivots $n'$ approximately midway between their ends and are connected by the ribbons $o$, extending parallel to each other and having the transverse ribbons $p$. At the outer end of the arms, where the ribbons are connected, are provided lugs $m$, that are adapted to engage with the bifurcated detent $l$ when the gate is placed in closed position. The arms $n$ are made, preferably, of metal tubes having crooked ends $r$, which are weighted with lead, so as to facilitate the operation of the gate. Between the supporting-posts $a$ and the rods $a'$ are arranged, some distance above and below the pivots $n'$, spring-actuating devices $q$ $q'$, which are adapted to receive the arms $n$, as will be explained hereinafter.

Adjacent the lower spring devices $q'$ are arranged cushion-frames $s$, that are pivotally mounted and provided with lugs $s'$, that receive the pins $s^2$, which are used to lock the gate when in open position as occasion may require, said pins $s^2$ being adapted to engage the crooked ends of the arms $n$, as shown in Fig. 2. The cushion-frame $s$ is made of spring strip metal bent centrally upon itself, and the ends are returned in parallel direction and supported between the posts $a$ and the rods $a'$. The crooked ends $r$ of the arms $n$ are adapted to pass into the cushion-frames $s$, which frames have lateral resiliency, so that the force of the gate is retarded and arrested by the frictional engagement between the same.

On the supporting-posts, below the tilting levers $g$, are provided levers 4, that carry adjustable sleeves 5, which have shanks 6, on which are hinged arms 7, that terminate in the hooks 8. When it is desired to set the gate in operative position, the gate is revolved about its pivotal centers until it rests in contact with the spring-actuating devices $q\ q'$. In order to place the gate under the tension of these devices, the levers 4 are raised to the position shown in dotted lines in Fig. 2, whereupon the hooks of the rods 7 are placed into engagement with the arms $n$. Pressure is then applied to the lever 4 in the direction of the arrow $q^2$, which causes the rods 7 to draw the arms $n$ inwardly against the tension of the springs $q\ q'$, so that the lugs $m$ become engaged by the bifurcated detents $l$. After this engagement is effected the rods 7 are released from the arms $n$, so that the gate is now in operative position. The detents $l$ may be released manually by means of the operating-rod $e$ tilting the bell-crank levers to cause the rods $f$ to tilt the levers $g$, so that the gate will be released and thrown into upward position under the influence of the springs $q\ q'$. The detents may, however, be released independently of the operating-rods $e$ by electrical devices that operate a lever 15, arranged in the slot 14 of the box 13. In this box 13 are arranged electromagnets, (not shown,) that are adapted to act upon an armature (not shown) suitably arranged to actuate the lever 15, said arrangement being in any desired manner to accomplish this purpose. The electromagnets are connected in circuit with the cell 17 and are connected by the conductors 17ª, which have the push-button or controller 18. By closing the circuit the lever 15 is caused to act upon the lever $j$, overcoming the weight $k$, so that the detent $l$ is released from the lugs $m$ of the arms $n$ of the gate. By the arrangement of the actuating-springs $q\ q'$ at opposite sides of the pivotal centers of the arms $n$ of the gate both ends are acted upon simultaneously, so that a quick and effective operation of the gate is obtained, and the weighted portions of the arms $n$ accelerate the motion.

Having thus described my invention, I claim as new and desire to secure by Letters Patent—

1. In a starting-gate for races, the combination of supporting-posts, a gate having arms pivotally mounted adjacent to their centers on said posts, springs oppositely disposed on each side of the pivotal centers of said arms, tilting levers having detents, lever mechanisms for bringing the gate into engagement with said detents against the tension of said springs, and means for releasing said detents, substantially as set forth.

2. In a starting-gate for races, the combination of supporting-posts, a gate having weighted arms fulcrumed adjacent to their centers, springs oppositely disposed on each side of the fulcrumed centers of said arms and secured on said supporting-posts, means for locking the gate in closed position, means for releasing the same, pivotally-mounted cushion-frames on said posts, and means on said cushion-frames for locking the gate in open position, substantially as set forth.

3. In a starting-gate for races, the combination of supporting-posts, a gate having arms pivotally mounted adjacent to their centers on said posts, springs oppositely disposed on each side of the pivotal centers of said arms, tilting levers having detents, lever mechanisms for bringing the gate into engagement with said detents against the tension of said springs, levers for actuating said tilting levers, and suitable electrical devices for actuating said last-mentioned levers, substantially as set forth.

In testimony whereof I have signed my name to this specification in the presence of two subscribing witnesses.

JOSEPH PIERRE CORNUAULT.

Witnesses:
EMILE LEDRET,
EDWARD P. MACLEAN.